Dec. 19, 1950     W. H. McGEE     2,534,612
CONVERTIBLE SEAT STRUCTURE FOR AUTOMOBILES
Filed Dec. 20, 1946     3 Sheets-Sheet 1
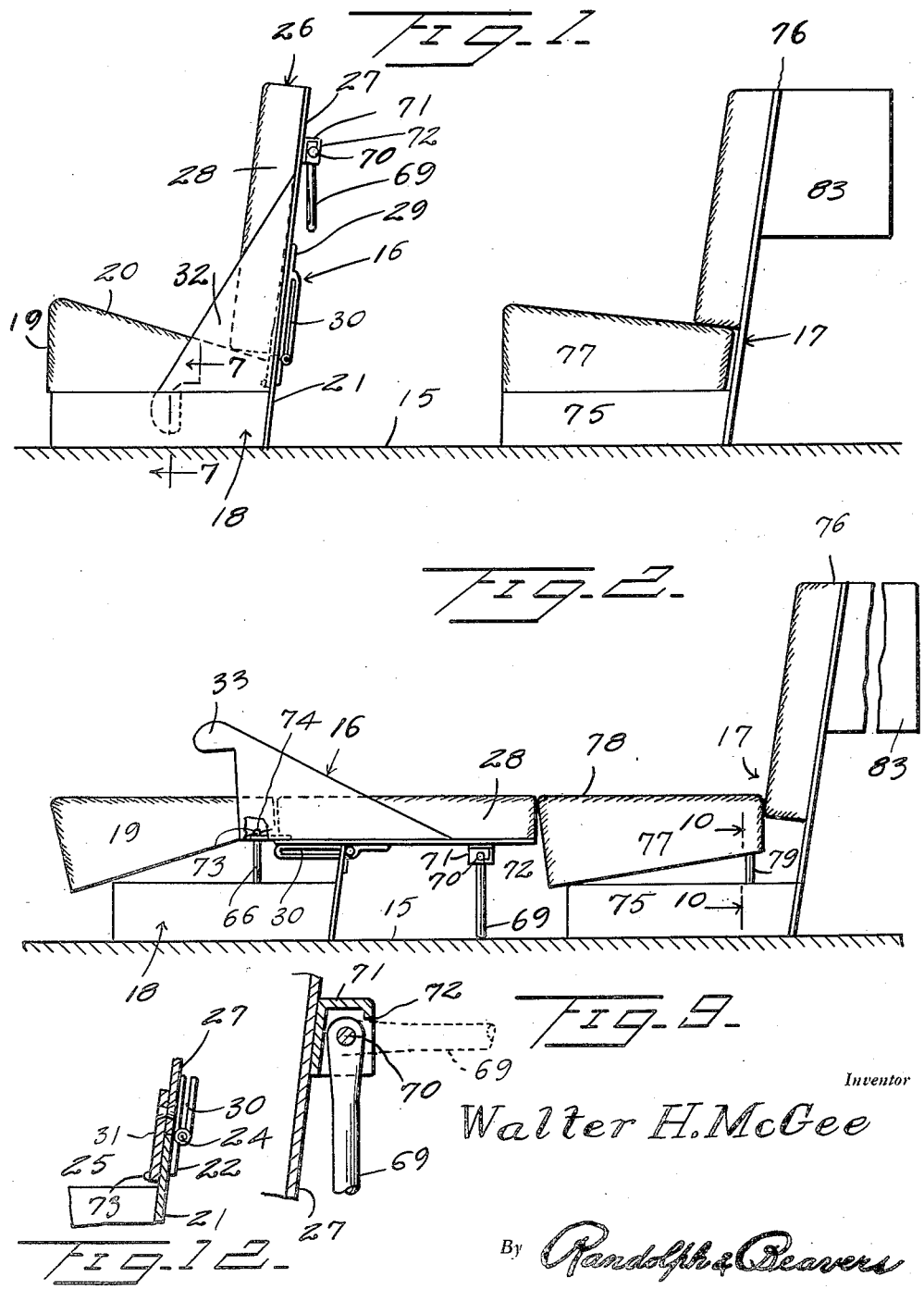
Inventor
Walter H. McGee
By Randolph & Beavers
Attorneys

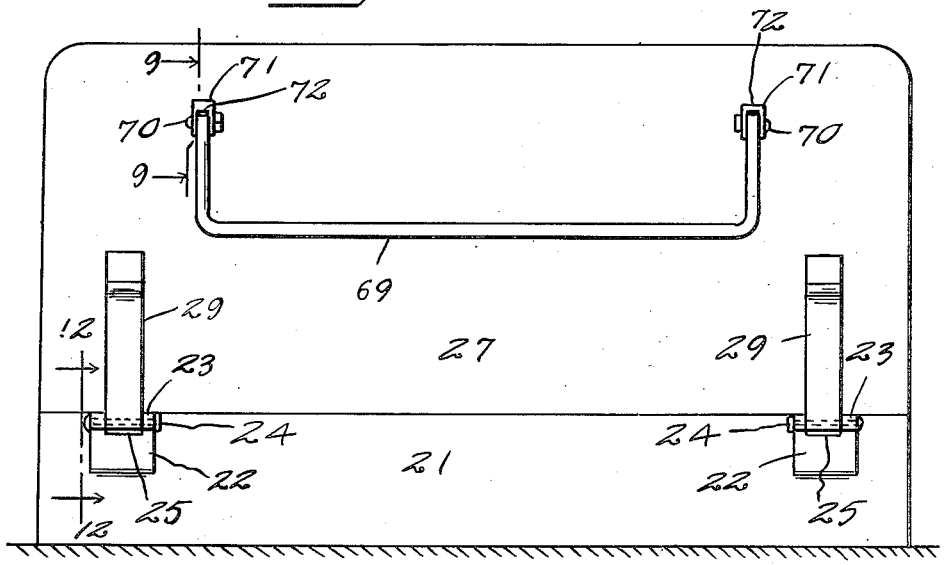
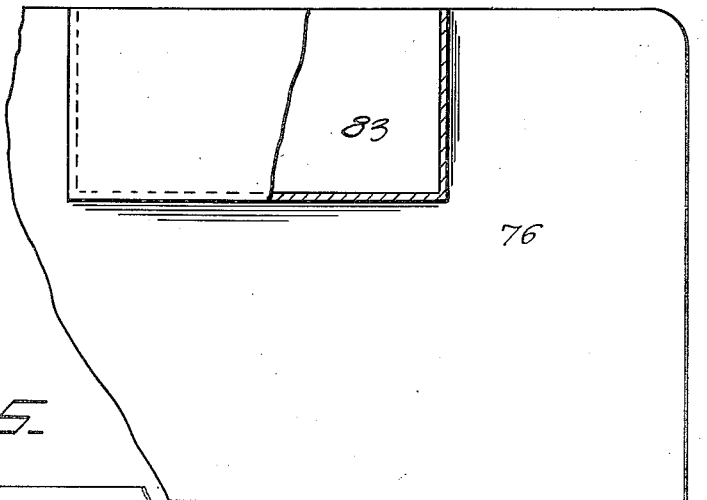
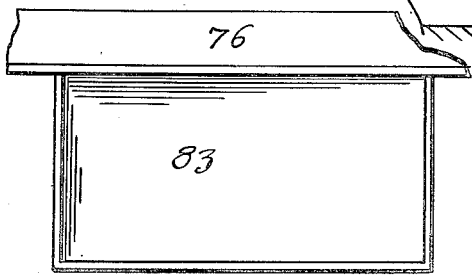

Dec. 19, 1950   W. H. McGEE   2,534,612
CONVERTIBLE SEAT STRUCTURE FOR AUTOMOBILES
Filed Dec. 20, 1946   3 Sheets-Sheet 3
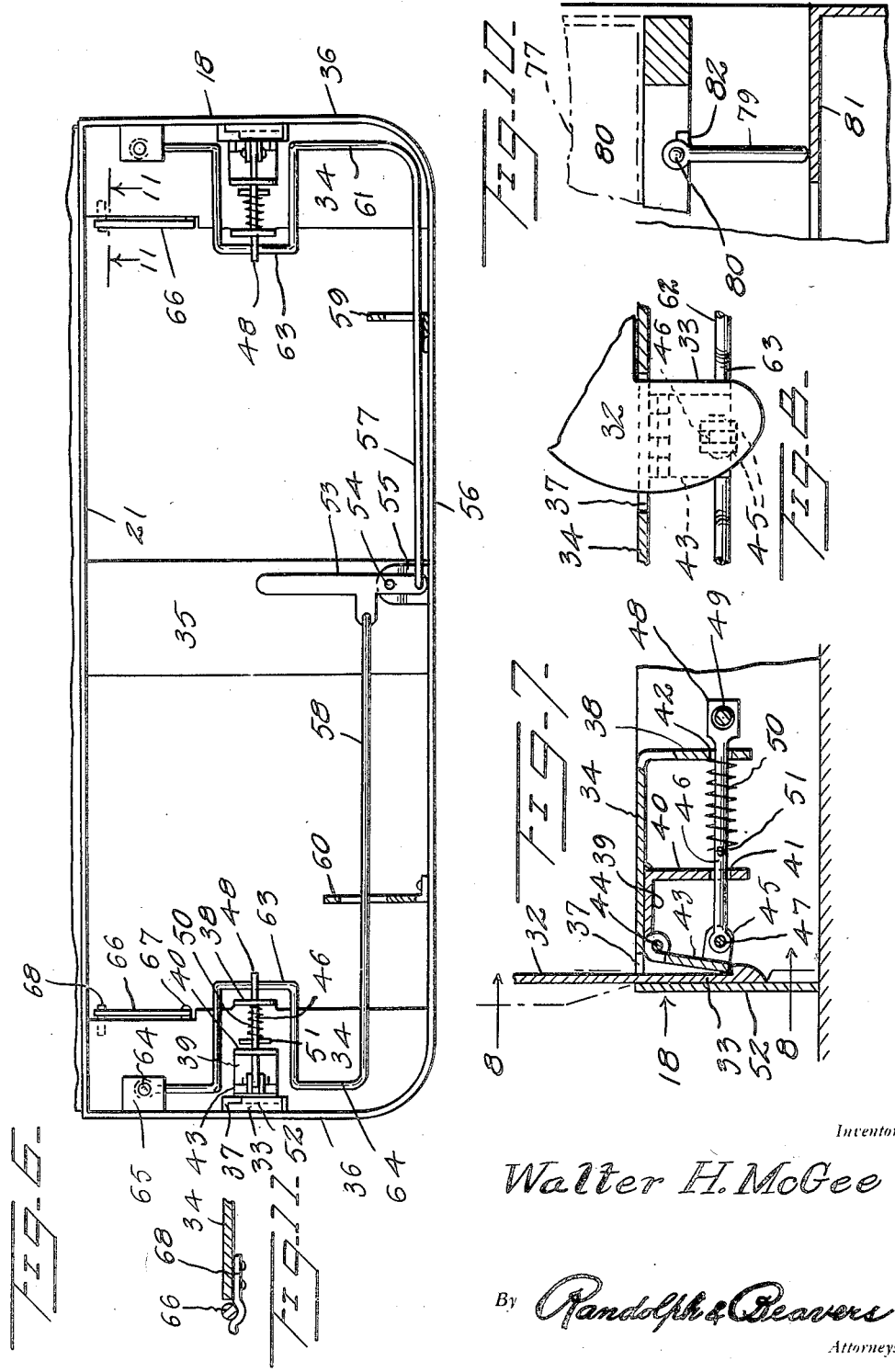
Inventor
Walter H. McGee
By Randolph & Beavers
Attorneys Patented Dec. 19, 1950

2,534,612

UNITED STATES PATENT OFFICE 2,534,612

CONVERTIBLE SEAT STRUCTURE FOR AUTOMOBILES

Walter H. McGee, Jefferson City, Mo., assignor of one-half to Mrs. Downie M. Kelly, Kensington, Md.

Application December 20, 1946, Serial No. 717,450

2 Claims. (Cl. 155—7)

This invention relates to a convertible seat structure for automobiles and more particularly to a construction of front and rear seats which is capable by adjustment of being readily converted into a bed.

More particularly, it is an object of the invention to provide a front automobile seat having a backrest capable of being moved to substantially a horizontal position so that the cushion thereof will be interposed between the front and rear seats and combined therewith to form a bed.

Another object of the invention is to provide means, associated with the backrest of the front seat and which will function for supporting the front seat cushion with its upper surface in substantially a horizontal plane and substantially level with the upper surface of the cushion of the backrest, when the latter is in a lowered position to form a bed.

Still another object of the invention is to provide means for adjustably supporting the rear seat cushion with the rear edge thereof in an elevated position and so that the upper surface of said cushion will be disposed substantially level with the upper surfaces of the backrest of the front seat and the front seat cushion, when the parts are arranged to form a bed.

Still a further object of the invention is to provide novel means of simple construction for latching the backrest of the front seat in substantially an upright position, for normal use and which is readily releasable for converting the parts to a bed.

Various other objects and advantages of the invention will hereinafter become more fully apparent from the following description of the drawings, illustrating a preferred embodiment thereof, and wherein:

Figure 1 is a side elevational view of the front and rear automobile seats, as constructed in accordance with the invention and in their normal position for use as vehicle seats having backrests;

Figure 2 is a similar view showing the parts adjusted to provide a bed;

Figure 3 is a rear elevational view of the front seat and backrest thereof and showing the latter in its position of Figure 1;

Figure 4 is a rear elevational view, partly in section, looking toward the rear side of the backrest of the rear seat;

Figure 5 is a fragmentary top plan view of the backrest of the rear seat;

Figure 6 is a bottom plan view, partly in section, of the base frame of the front seat;

Figure 7 is an enlarged vertical sectional view taken substantially along a plane as indicated by the line 7—7 of Figure 1;

Figure 8 is a fragmentary vertical sectional view taken substantially along a plane as indicated by the line 8—8 of Figure 7;

Figure 9 is an enlarged vertical sectional view taken substantially along a plane as indicated by the line 9—9 of Figure 3;

Figure 10 is a vertical sectional view taken substantially along a plane as indicated by the line 10—10 of Figure 2;

Figure 11 is a vertical sectional view taken substantially along a plane as indicated by the line 11—11 of Figure 6, and Figure 12 is a vertical sectional view taken substantially along a plane as indicated by the line 12—12 of Figure 3.

Referring more specifically to the drawings, the numeral 15 designates generally the floor of an automobile or other passenger vehicle of similar type and the numerals 16 and 17 designate generally the front and rear seats and backrests, respectively, of the automobile or vehicle.

The front seat 16 includes a base frame 18 which is suitably secured to the floor 15 and which provides a support for a front seat cushion 19 having an upper surface 20 which is inclined rearwardly and downwardly. The rear wall 21 of the frame 18 extends to above the upper edges of the sides and front walls thereof and is provided on its outer or rear side with brackets 22 having upstanding aperture gears or lugs 23 to mount pivot pins 24. The ears or lugs 23 extend to adjacent the upper edge of the rear wall 21 and said rear wall is provided with notches or recessed portions 25 disposed between each pair of the ears 23.

The front seat 16 also includes a backrest, designated generally 26 and comprising a rear wall 27 and a cushion 28 which is secured to the forward side of the wall 27 and which is disposed above the rear edge portion of the seat cushion 20 when the backrest 26 is in its substantially upright position of Figure 1. The wall 27 is provided on the rear side thereof with vertically disposed bars 29 which align with the brackets 22 and which are provided with longitudinal slots 30 to slidably and pivotally engage the pivot pin 24. The rear wall 27 is provided with a plate 31 which is secured to the lower portion of the forward side thereof and which extends to below the bottom edge of the wall 27 to bear against the inner or forward side of the upper portion of the rear wall 21 when the backrest 26 is in its upright position, as seen in Figures 1 and 12.

The rear wall 27 is provided with upwardly tapered side walls 32 having widened lower portions which protrude substantially below the bottom edges of the wall 27 and cushion 28 and which are provided at their forward, lower ends with integral depending projections 33. As best seen in Figures 6 and 7, the frame 18 is provided with top wall portions 34 at the ends thereof and which cooperate with a central wall portion 35 to provide a rest upon which the seat cushion 19 is supported when in its normal position of Figure 1. The wall portions 34 are each provided, intermediate of their ends and adjacent the end walls 36 of the frame 18 with openings 37 through which the extensions 33 project when the backrest 26 is in its position of Figure 1.

As best seen in Figures 6 and 7, the wall portions 34 are each provided with a depending flange or extension 38 at their inner edge and intermediate of their ends and with a bracket 39 which is welded or otherwise secured to the underside thereof, adjacent the opening 37. Each bracket 39 is provided with a depending flange or extension 40 having an opening 41 therein to align with an opening 42 of the complementary flange or extension 38.

Each bracket 39 provides a support for a depending pivotally mounted latch plate 43 which is pivotally mounted at 44 thereto, beneath and adjacent the associated opening 37. Each latch plate 43 is provided with apertured ears 45 which project from the inner side thereof and adjacent its lower, free end to receive the apertured end of a plunger rod 46 which is pivotally connected to the ears 45 by a pivot pin 47. Each plunger rod 46 is slidably disposed in the openings 41 and 42 of the wall portion 34, with which it is associated and has a head 48 at its opposite end, disposed inwardly of the flange 38 thereof and which is provided with a horizontally disposed bore or opening 49. An expansion coiled spring 50 is carried by each plunger rod 46 between its supporting flange 38 and a pin 51 which extends transversely through said rod, for urging the plunger rod in a direction toward the adjacent end wall 36 of the frame for thereby swinging its latch plate 43 toward the adjacent extension 33. Said extension 33 is provided on its inner side with an upwardly facing shoulder 52 over which the bottom edge of the latch plate 43 is normally held by the spring biased plunger rod 46, so that the two side walls 32 are detachably latched in the frame 18 for releasably maintaining the backrest 26 in its substantially upright position of Figure 1.

As seen in Figure 6, a manually actuated lever 53 is pivotally mounted at 54, adjacent one end thereof, on a bracket 55 which projects inwardly from the front wall 56 of the frame 18. A pair of operating rods 57 and 58 are pivotally connected at their adjacent ends to the lever 53 on opposite sides of its pivot 54 and project therefrom in opposite directions and substantially parallel to the front wall 56 and are guided by guide members 59 and 60, respectively, which extend inwardly from said front wall 56. The operating rods 57 and 58 are provided with rearwardly extending end portions 61 and 62, respectively, having corresponding inwardly offset portions 63 which extend loosely through the bores 49 of the plunger rods 46, and corresponding opposite ends which are apertured to pivotally engage pivot pins 64 supported by lugs 65 which extend inwardly from the end walls 36. It will thus be readily apparent that when the lever 53 is rocked in a clockwise direction, as seen in Figure 6, the operating rods 57 and 58 will be caused to pivot on the pins 64 so that their portions 63 will be moved toward one another for retracting the plunger rods 46 and withdrawing the latch plates 43 from engagement with the shoulders 52 so that the side walls 32 will be released to permit the backrest 26 to be swung downwardly and rearwardly from its position of Figure 1 to its position of Figure 2. Before this can be accomplished, the front seat cushion 19 is removed and the downward swinging movement of the backrest 26 is accomplished by said backrest pivoting through the pivotal engagement of the slots 30 with the pins 24. As the backrest 26 is swung downwardly it is also pushed forwardly, the slots 30 slidably engaging the pivot pins 24 and the bars 29 thereof sliding through the notches or recesses 25 of the rear wall 21 during this movement.

As best seen in Figures 6 and 11, the inner edges of the top wall parts 34 of the frame 18, adjacent the rear wall 21 thereof, are recessed to receive legs 66, one of which is associated with each wall portion 34 and which are pivotally mounted at their forward ends by pivot pins 67, which project from the wall portions 34. The wall portions 34 are provided on their under sides with supporting brackets 68 having free ends which overlie their inner, recessed edges for normally supporting the pins 66 in an inoperative position, substantially parallel to the top wall portions 34, as illustrated in Figures 6 and 11.

The rear wall 27 of the backrest 26 is provided adjacent its upper edge with a conventional form of robe or garment rack 69 which is pivotally supported at the terminals of its upturned ends by pivot pins 70 which are supported by brackets 71. The brackets 71 are suitably secured to the outer, rear side of the wall 27 and are provided with flanged portions forming stops 72 for limiting the upward and outward swinging movement of the rack 69 relatively to the wall 27 so that it can only be swung to slightly beyond a position perpendicular to said wall, as illustrated in dotted lines in Figure 9 and in full lines in Figure 2. The rack 69 functions in a conventional manner when the backrest 26 is in its upright position of Figure 1 but functions additionally as supporting legs for the rear or upper end of the backrest when the latter is in its lowered, substantially horizontal position of Figure 2 and with the intermediate portion thereof supported by engagement of the bars 29 with the pivot pins 24. When thus disposed, as seen in Figure 2, the backrest 26 is substantially horizontal and the plate 31 is similarly disposed and projects forwardly from the cushion 28 to provide a support for the rear, tapered edge of the front seat cushion 19 so as to support the upper surface 20 thereof in substantially the same plane as the upper surface of the cushion 28. The plate 31 is provided adjacent its bottom, free edge and on its upper or forward side with a plurality of tits or projections 73 which are adapted to fit recesses 74 in the under side of the seat cushion 19 for retaining said cushion in engagement with the supporting plate 31 and with the forward portion thereof supported by the upper edge of the front wall 56 of the frame 18. When the backrest 26 is moved to its horizontal position of Figure 2, the legs 66 are swung upwardly and forwardly to engage under the plate 31 adjacent its forward, free edge to combine with the rack 69, the bars 29 and pins 24 to support and maintain the backrest 26 and front seat cushion 19 in substantially their positions of Figure 2.

The rear seat, designated generally 17, includes a frame 75 having a backrest 76 rigidly secured thereto and a seat cushion 77 having an upper surface which is likewise inclined rearwardly and downwardly. The rear seat 17 likewise functions in a conventional manner when the front seat 16 is in its normal position of Figure 1 and the seat cushion 77 only thereof functions in conjunction with the front seat cushion 19 and backrest 26 when the latter parts are in their positions of Figure 2. The rear seat cushion 77 is moved forwardly to a position against the upper or outer end of the backrest cushion 28 and the rear end of the cushion is raised to position the upper surface 78 thereof in substantially the same plane as the upper surface 20 and the upper surface of the cushion 28. When thus disposed, the rear end of the rear seat cushion 77 has a portion thereof bearing against the outer surface of the cushion of the backrest 76 and the rear end of said cushion 77 is supported as thus raised by a plurality of legs 79, as best seen in Figure 10, which are pivotally mounted at 80 on the bottom frame of the cushion 77 and which are swingable downwardly and outwardly from normal positions within the frame to substantially upright positions, as seen in Figures 2 and 10, in which the free ends of the legs 79 rest on top wall portions 81 of the rear seat frame 75. The frame of the cushion 77 is provided with stops 82 for limiting the extent that the legs 79 can swing downwardly and outwardly and for maintaining said legs substantially in an upright position.

The rear wall of the backrest 76 is provided on its rear or outer side with a lock or receptacle 83 adapted to contain bedding for use on the bed, formed by the cushions 19, 28 and 77.

In view of the foregoing description of the parts and their operation, a further description of the invention is considered unnecessary. In returning the parts to their positions of Figure 1 from their positions of Figure 2, the legs 66 and 79 are swung to inoperative positions and the backrest 26 is swung upwardly and back to its position of Figure 1. As the extensions 33 move through the openings 37 they will engage and retract the latch plates 43 and plunger rod 46 to permit the upwardly facing shoulders 52 to move to positions beneath the latch plates and so that said plates can then be projected by the spring biased rods 46 back into their position of Figures 6, 7 and 8 for latching the backrest 26 in substantially an upright position. The seat cushions 19 and 77 may then be readily returned to their position of Figure 1.

Various modifications and changes are contemplated and may obviously be resorted to, without departing from the spirit or scope of the invention as hereinafter defined by the appended claims.

I claim as my invention:

1. In a convertible seat structure for automobiles, a front seat and a rear seat disposed in spaced apart relationship to the front seat, said front seat including a base frame, a seat cushion and backrest, said seat cushion being removably supported on the base frame, said backrest being slidably and pivotally supported on the base frame for movement from substantially an upright position to substantially a horizontal position, and said backrest, in said last mentioned position, being disposed with the cushion thereof uppermost and between the front seat cushion and the seat cushion of the rear seat, said backrest having depending side members extending into the front seat frame and provided with upwardly facing shoulders, latch members pivotally mounted in said frame, and spring biased plungers engaging said latch members for releasably retaining them in engagement with said shoulders for latching the backrest in its normal, substantially upright position.

2. A seat structure as in claim 1, and a manually actuated link and lever means for retracting said plungers and latch members for disengaging the latch members from the side members of the backrest.

WALTER H. McGEE.

REFERENCES CITED

The following references are of record in the file of this patent:

UNITED STATES PATENTS

| Number | Name | Date |
|---|---|---|
| 1,059,220 | Saxon | Apr. 15, 1913 |
| 1,301,488 | Myers | Apr. 22, 1919 |
| 1,316,007 | Waller | Sept. 16, 1919 |
| 1,453,372 | Wong | May 1, 1923 |
| 1,714,891 | Richardson | May 28, 1929 |

FOREIGN PATENTS

| Number | Country | Date |
|---|---|---|
| 245,333 | Great Britain | Jan. 7, 1926 |